United States Patent [19]

Hojo et al.

[11] Patent Number: 5,127,288
[45] Date of Patent: Jul. 7, 1992

[54] SHIFT CONTROL SYSTEM WITH AN AUTOMATIC FIRST SEQUENCE AND A MANUAL SECOND SEQUENCE OF GEAR STAGES

[75] Inventors: Yasuo Hojo, Nagoya; Toshiyuki Asada, Toyota; Hideo Tomomatsu, Nagoya, all of Japan

[73] Assignee: Toyota Jidosha Kabushiki Kaisha, Toyota, Japan

[21] Appl. No.: 668,171

[22] Filed: Mar. 12, 1991

[30] Foreign Application Priority Data

Mar. 12, 1990 [JP] Japan .................. 2-60849

[51] Int. Cl.$^5$ ............................................. F16H 59/66
[52] U.S. Cl. ...................................... 74/866; 74/856; 364/424.1
[58] Field of Search ............. 74/856, 844, 866; 364/424.1; 475/271, 272, 275, 276, 281, 284, 288, 290, 291, 296, 297, 329, 330

[56] References Cited

U.S. PATENT DOCUMENTS

| | | | |
|---|---|---|---|
| 3,640,153 | 2/1972 | Kepner | 475/276 |
| 3,650,161 | 3/1972 | Ito et al. | 74/866 |
| 3,863,524 | 2/1975 | Mon et al. | 475/57 |
| 4,025,684 | 6/1991 | Stehle et al. | 74/866 X |
| 4,263,823 | 4/1981 | Numazawa | 475/59 |
| 4,653,348 | 3/1987 | Hiraiwa | 475/276 |
| 4,693,142 | 9/1987 | Kurihara et al. | 74/878 X |
| 4,733,580 | 3/1988 | Kubo et al. | 74/866 |
| 4,742,733 | 5/1988 | Schreiner | 74/866 |
| 4,848,529 | 7/1989 | Kurihara et al. | 74/866 X |
| 4,897,790 | 1/1990 | Bieber | 74/866 X |
| 4,905,530 | 3/1990 | Stehle et al. | 74/335 |
| 4,963,124 | 10/1990 | Takahashi et al. | 475/278 |
| 4,987,792 | 1/1991 | Mueller et al. | 74/473 R |
| 5,009,128 | 4/1991 | Seidel et al. | 74/DIG. 7 |

FOREIGN PATENT DOCUMENTS

2-125174 5/1990 Japan .

OTHER PUBLICATIONS

"Car and Driver", Technical Highlights by NBD, Jan. 1990, p. 131.

*Primary Examiner*—Richard Lorence
*Assistant Examiner*—Khoi A. Ta
*Attorney, Agent, or Firm*—Oblon, Spivak, McClelland, Maier & Neustadt

[57] ABSTRACT

A shift control system for a vehicular automatic transmission including a gear train to be set to a plurality of gear stages in accordance with the engaged or released states of a plurality of friction devices. The shift control system comprises: a mode selector for interchanging an automatic shift mode to effect a shift according to a first gear stage train, which is composed of a plurality of gear stages selected from those capable of being set with the gear train, a manual shift mode to effect a shift according to a second gear stage train, which is composed of other plural gear stages selected from those capable of being set with the gear train; an automatic shift output device for outputting a shift signal in accordance with the running state of the vehicle to set any of the gear stages of the first gear stage train when the automatic shift mode is selected; a gear stage selector for outputting an upshift signal and a downshift signal in response to the manual operations of upshift and downshift, respectively, when the manual shift mode is selected; a manual shift output device responding to the upshift signal and downshift signal outputted from the gear stage selector, for outputting a shift signal to select a gear stage from the second gear shift train and to set the selected gear stage; and a hydraulic controller for feeding/releasing an oil pressure to the friction devices to set the gear stage which is commanded by the shift signals outputted from the automatic shift output device and the manual shift output device.

13 Claims, 4 Drawing Sheets

SHIFT CONTROL SYSTEM WITH AN AUTOMATIC FIRST SEQUENCE AND A MANUAL SECOND SEQUENCE OF GEAR STAGES

BACKGROUND OF THE INVENTION

The present invention relates to shift controls of an automatic transmission for a vehicle and, more particularly, to shift control system and method for an automatic transmission, which can interchange automatic and manual shifts.

As is well known in the art, the automatic transmission is constructed to switch the transmission paths of a drive power through a gear train composed of planetary gear sets and so on, by means of engagement devices such as clutches and brakes, thereby to set a plurality of gear stages. Moreover, a shift to each of the gear stages by actuating shift valves (or change-over valves) to feed or release the oil pressure to predetermined friction devices in response to a first signal such as a throttle opening relating to an engine load and a second signal relating a vehicle speed. In other words, the substantial shifts are performed by switching the shift valves. If, therefore, these shift valves were manually switched, the manual shifts could be accomplished. One example of the systems capable of interchanging the automatic shift mode and the manual shift mode has been proposed in Japanese Patent Publication No. 48-210.

This proposal is constructed such that the automatic shift mode or the manual shift mode can be selected by the shift lever. In case the shift lever is in a first position to select the automatic shift mode, the shift is effected on the basis of a signal indicating the running state such as the throttle opening and the vehicle speed. In case, on the other hand, the shift lever is in a second position to select the manual shift mode, one of the 1st to 3rd speeds of the gear stages to be selected in the automatic shift mode is selected by the shift lever.

As described above, the automatic shifts are effected on the basis of the running state of the vehicle and are frequently achieved irrespective of the intention of the driver. If, therefore, the shifts are not smooth, the driver will be given a discomfortable feel. In the aforementioned system of the prior art, therefore, the individual gear stages are ordinarily set in the existing system, too, such that the shifts may not excessively occur in the automatic shift mode. Since, on the contrary, the manual shift is based upon the intention of the driver, the shift timing and the running state may often fail to match. In order to reduce the shift shocks at the mismatch, it is preferable to reduce the difference between the gear ratios and accordingly the difference in the torque before and after the shift. In the existing system, however, the gear state to be selected in the automatic transmission mode is also selected in the manual shift mode so that the torque difference may possibly be increased across the shift to deteriorate the shift shocks. If, on the contrary, the difference between the gear ratios is reduced to lighten the shift shocks at the manual shifting time, the shift is accomplished between the gear stages of small gear ratios, too, in the automatic shift mode. Then, the shifts are caused frequently enough to invite the so-called "busy shifts" so that the passengers may possibly be given the discomfortable feeling.

SUMMARY OF THE INVENTION

An object of the present invention is to provide system and method which can control shifts without frequent shift at the time of an automatic shift mode and with less shift shocks at the time of a manual shift mode.

Another object of the present invention is to provide shift control system and method which have different gear stages to be set in the automatic shift mode and in the manual shift mode.

Still another object of the present invention is to reduce the amplitude of fluctuations of the output torque at the time of the manual shift mode.

A further object of the present invention is to provide a shift control system for an automatic transmission, which can effect manual shifts step by step.

According to a first feature of the present invention, there is provided a shift control system for a vehicular automatic transmission including a gear train to be set to a plurality of gear stages in accordance with engaged or released states of a plurality of friction devices, which system comprises: mode selection means for selectings an automatic shift mode to effect a shift according to a first sequence of gear stages, which is composed of a plurality of sequence of gear stages from those capable of being set with said gear train, a manual shift mode to effect a shift according to a second sequence of gear stages, which is composed of other plural gear stages selected from those capable of being set with said gear train; automatic shift output means for outputting a shift signal in accordance with the running state of the vehicle to set any of the gear stages of said first sequence of gear stages when said automatic shift mode is selected; gear stage selection means for outputting an upshift signal and a downshift signal in response to operations of manual upshift and downshift, respectively, when said manual shift mode is selected; manual shift output means responding to the upshift signal and downshift signal outputted from said gear stage selection means, for outputting a shift signal to select a gear stage from said second sequence of gear stages and to set the selected gear stage; and hydraulic control means for feeding/draining an oil pressure to said friction devices to set the gear stage which is commanded by the shift signals outputted from said automatic shift output means and said manual shift output means.

In the shift control system of the present invention, moreover, absolute values of difference between gear ratios of adjoining gear stages of said first sequence of gear stages are smaller than those of the adjoining gear stages of said second sequence of gear stages.

According to a second feature of the present invention, there is provided a shift control method for a vehicular automatic transmission including a gear train to be set to a plurality of gear stages in accordance with engaged or released states of a plurality of friction devices, which method comprises: outputting a shift signal in accordance with running state of the vehicle, when an automatic shift mode to effect a shift according to a first sequence of gear stages composed of a plurality of gear stages selected from those capable of being set with said gear train is selected, so as to set any of the gear stages of said first sequence of gear stages so that a hydraulic control unit may be actuated in response to said shift signal to set a gear stage instructed by said shift signal; and outputting an upshift signal and a downshift signal by manual operations of upshift and downshift, respectively, when a manual shift mode to effect a shift according to a second sequence of gear stages composed of other plural gear stages selected from those capable of being set with said gear train is selected, so as to set any of the gear stages of said first gear stage train so that said hydraulic control unit may be actuated in response to a shift signal based upon said upshift signal and said downshift signal to execute an upshift and a downshift.

The above and further objects and novel features of the present invention will more fully appear from the following detailed description when the same is read with reference to the accompanying drawings. It is to be expressly understood, however, that the drawings are for the purpose of illustrations only and is not intended as a definition of the limits of the invention.

BRIEF DESCRIPTION OF THE DRAWINGS

A more complete appreciation of the present invention and many of the attendat advantages thereof will be readily obtained as the same becomes better understood by reference to the following detailed description when considered with reference to the accompanying drawings, wherein.

DETAILED DESCRIPTION OF THE PREFERRED EMBODIMENT

Figure 1:
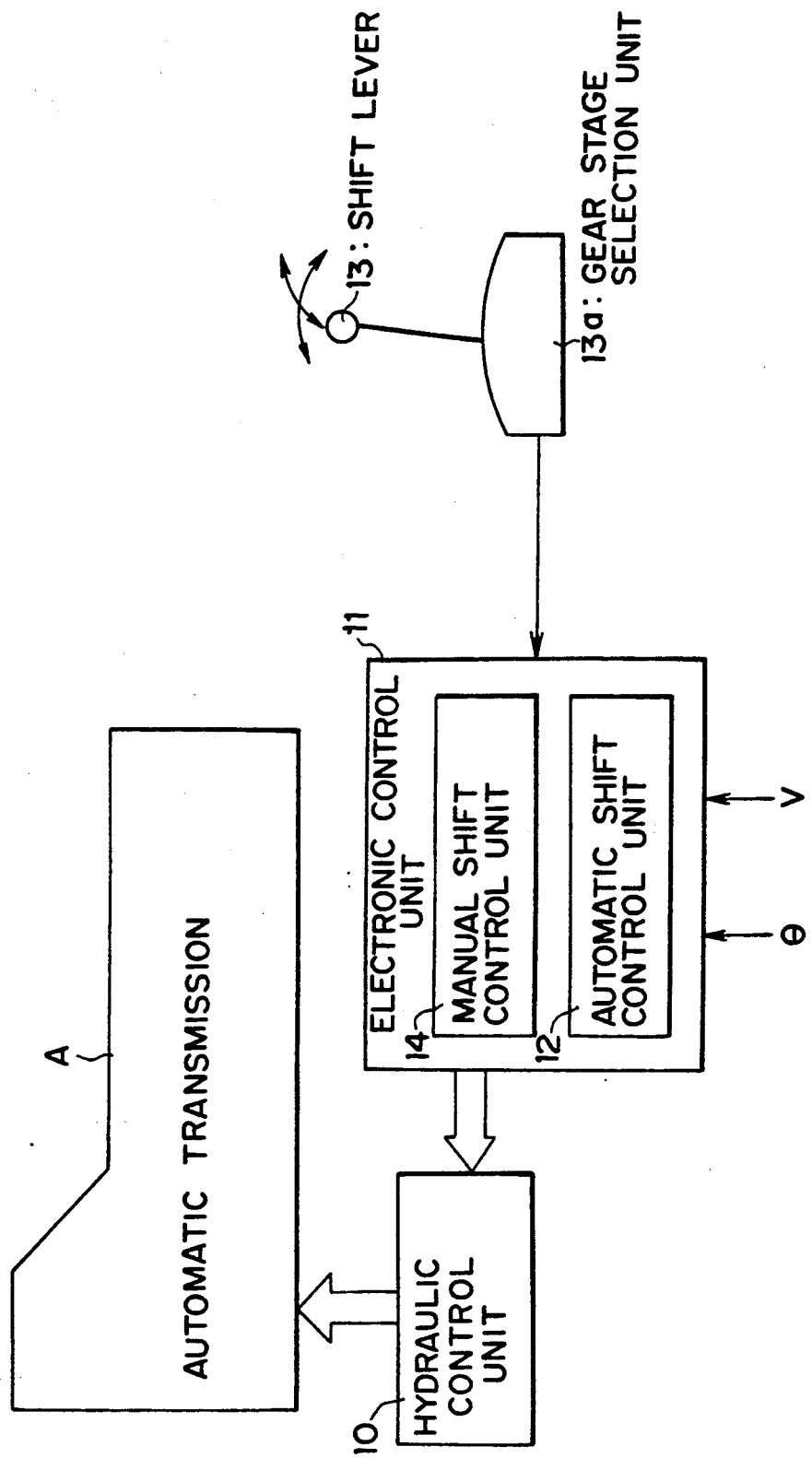
FIG. 1 is a block diagram showing one embodiment of the basic structure of the present invention.

FIG. 1 is a block diagram showing one embodiment of the basic structure of the present invention. An automatic transmission A is composed mainly of a plurality of later-described planetary gear set and is equipped with a gear train for setting a plurality of gear stages by combining the engagement and release of a plurality of friction devices. There is also provided a hydraulic control unit 10 for feeding and draining an oil pressure to and from the individual friction devices so as to set one of the gear stages. The hydraulic control unit 10 to be used can be exemplified by the structure, which is adopted in the existing ordinary automatic transmission and includes a hydraulic pump, a pressure regulating valve, a shift valve and a solenoid valve. With this hydraulic control unit 10, there is connected an electronic control unit 11 for outputting signals to set the individual gear stages. This electronic control unit 11 is equipped with: an automatic shift control unit 12 for selecting a gear stage and outputting a shift signal in accordance with the running state of the vehicle such as a throttle opening $\theta$ or a vehicle speed V; and a manual shift contrl unit 14 for selecting a gear stage and outputting a shift signal in response to a signal which is outputted by operating a shift lever 13. Sequence of gear stages to be selected by the automatic shift control unit 12 and a sequence of gear stages to be selected by the manual shift control unit 14 are common in part but different in its entirety. The absolute value of difference between the gear ratios of the sequence of gear stages selected by the manual shift control unit 14 is smaller than that of the gear ratios of the sequence of gear stages selected by the automatic shift control unit 12, as will be specifically described hereinafter.

Figure 2:
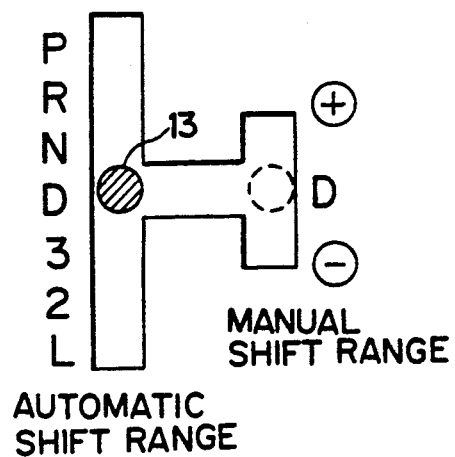
FIG. 2 is a schematic diagram showing the operating mechanism of a shift lever.

The shift lever 13 also acts as mode selection means for selecting the automatic shift mode and the manual shift mode. The shift lever 13 can be tilted forward and backward or rightward and leftward to select the automatic shift mode and the manual shift mode. When the shift lever 13 is positioned at the lefthand side of FIG. 2 to select the automatic shift mode, it can select one of the parking (P), reverse (R), drive (D), 3rd speed (3), 2nd speed (2) and low speed (L) ranges to switch the known manual valves accordingly. Moreover, the switching between the automatic shift mode and the manual shift mode is accomplished in the D range. In case the shift mode is switched from the automatic to the manual one, the gear stage immediately before the switching is held, and the connection to the manual valve (although not shown) is released. In the manual shift mode, still moreover, the shift lever 13 is connected to a gear stage selection unit 13a so that an upshift signal is outputted from the gear stage selection unit 13a by moving the shift lever 13 upward of FIG. 2 from the position of the D range. If the shift lever 13 is moved downward, on the contrary, a downshift signal is outputted from the gear stage selection unit 13a and inputted to the aforementioned manual shift control unit 14.

Here will be described one example of the gear train of the aforementioned automatic transmission A with reference to FIG. 3. In the example, as shown, the gear train is composed mainly of three single-pinion type planetary gear sets, which have their respective components connected in the following manner. Specifically, the carrier 1C of the first planetary gear set 1 and the ring gear 3R of the third planetary gear set 3 are connected to each other so that they may rotate together. The ring gear 2R of the second planetary gear set 2 and the carrier 3C of the third planetary gear set 3 are connected to each other so that they may rotate together. Moreover, the sun gear 1S of the first planetary gear set 1 is connected through second clutch means K2 to the carrier 2C of the second planetary gear set 2 and further through fourth clutch means K4 to the sun gear 2S of the second planetary gear set 2. The carrier 2C of the second planetary gear set 2 is connected to the sun gear 3S of the third planetary gear set 3.

Incidentally, the connection structures of the aforementioned individual components to be used may be those adopted in the existing automatic transmission such as quill shafts, solid shafts or suitable connecting drums.

An input shaft 4 is connected through power transmission means such as a torque converter or fluid coupling to an engine (although not shown either). Between the input shaft 4 and the ring gear 1R of the first planetary gear set 1, there is interposed first clutch means K1 for connecting the two selectively. Between the input shaft 4 and the sun gear 1S of the first planetary gear set 1, on the other hand, there is interposed third clutch means K3 for connecting the two selectively.

For practical applications, the aforementioned individual clutch means K1 to K4 may be constructed of multiple disc clutches or one-way clutches or their combinations. From restrictions on the arrangements of the individual components, moreover, it is quite natural that the connection members for the individual clutch means K1 to K4 can be exemplified by suitable intermediate members such as connecting drums.

As the brake means for blocking the rotations of the rotating members of the aforementioned planetary gear sets 1, 2 and 3, there are provided: second brake means B2, which is interposed between the carrier 2C of the second planetary gear set 2 and a transmission casing 5 (which will be shortly referred to as the "casing") 6; and third brake means B3 which is interposed between the sun gear 2S of the second planetary gear set 2 and the casing 6. These brake means B2 and B3 thus enumerated can be exemplified by multiple disc brakes, band brakes or combinations of one of the two with one-way clutches. It is also quite natural that suitable connection members can be interposed between those brake means B2 and B3 and either members to be braked by them or the casing 6.

Moreover, an output shaft 5 for transmitting the rotations to a propeller shaft or counter gear (although not shown either) is connected to the ring gear 2R of the second planetary gear set 2 and the carrier 3C of the third planetary gear set 3, which in turn are connected to each other.

The gear stages to be set by the automatic transmission A having the aforementioned gear train and the gear ratios in the individual gear stages are enumerated in Table 1. These gear stages can be set by engaging the friction devices, as indicated by symbols ◯ in FIG. 1, and by releasing the friction devices in blanks. The shifts to those gear stages can be achieved such that the hydraulic control unit 10 feeds or discharges the oil pressure to or from the predetermined friction devices on the basis of command signals coming from the aforementioned electronic control unit 11 to engage or release the friction devices. The individual gear ratios appearing in Table 1 take values in case the gear ratios (i.e., the ratios of the tooth numbers of the sun gear and the ring gear) of the individual planetary gear sets 1, 2 and 3 are set at $\rho 1=0.450$, $\rho 2=0.405$ and $\rho 3=0.405$. Symbols * indicate that the corresponding components may be engaged. Moreover, columns designated at symbols ①, ②, ③- - -, and so on indicate different engagement/release patterns for setting the corresponding gear stages.

TABLE 1

|  | Clutch Means | | | | Brake Means | | Gear Ratio |
| --- | --- | --- | --- | --- | --- | --- | --- |
|  | K1 | K2 | K3 | K4 | B2 | B3 |  |
| 1st | ◯ |  |  | ◯ | ◯ |  | 3.149 |
| 2nd | ◯ | ◯ |  |  | ◯ |  | 2.037 |
| 2.5th | ◯ |  |  | ◯ |  | ◯ | 1.619 |
| 3rd | ◯ |  | ◯ |  | ◯ |  | 1.405 |
| 3.2th | ◯ | ◯ |  |  |  | ◯ | 1.299 |
| 3.5th | ◯ |  | ◯ |  |  | ◯ | 1.117 |
| 4th |  |  |  |  |  |  |  |
| ① | ◯ | ◯ | ◯ | * |  |  | 1.000 |
| ② | ◯ | ◯ | * |  | ◯ |  |  |
| ③ | ◯ | * | ◯ |  | ◯ |  |  |
| ④ | * |  | ◯ | ◯ | ◯ |  |  |
| 5th |  | ◯ | ◯ |  |  | ◯ | 0.712 |
| Rev |  |  | ◯ | ◯ | ◯ |  | −2.469 |

Of the gear stages, as enumerated in Table 1, the first sequence of gear stages to be selected in the automatic shift mode includes the 1st, 2nd, 3rd, 4th and 5th speeds, at which the gear ratios have a relation approximate to the geometric series. These gear stages are selected on the basis of the running state of the vehicle, such as the throttle opening $\theta$ and the vehicle speed V. As in the existing ordinary automatic transmission, according to a specific method, the automatic shift control unit 12 is stored with the shift diagram having the throttle opening $\theta$ and the vehicle speed V as its parameters so that the individual gear stages are selected in accordance with the shift chart on the basis of the data which are inputted from the throttle opening sensor and the vehicle speed sensor (neither of which is shown).

On the other hand, the second sequence of gear stages be selected in the manual shift mode is composed of all the forward stages enumerated in Table 1. Specifically, a 2.5th speed is present between the 2nd and 3rd speeds, and 3.2th and 3.5th speeds are present between the 3rd and 4th speeds. As a result, the differences between the gear ratios are reduced between those gear stages. The shifts according to this second sequence of gear stages are performed by outputting the upshift signal or the downshift signal from the gear stage selection unit 13a at each time when the shift lever 13 is fallen upward or downward of FIG. 2. Specifically, when the upshift signal is once outputted, the manual shift control unit 14 selects a gear stage higher by one step than the present gear stage and outputs a shift signal for setting that gear stage to the hydraulic control unit 10. If the upshift signal is outputted while the vehicle is running at the 3rd speed, for example, signals are outputted to release the third clutch means K3 and the second brake means B2 of the first clutch means K1, the third clutch means K3 and the second brake means B2, which are engaged to set the 3rd speed, and to engage the second clutch means K2 and the third brake means B3. In accordance with these releases and engagements, the hydraulic control unit 10 controls the feed/drain of the oil pressure so that the 3.2th speed is set. If the downshift signal is once outputted, on the contrary, the manual shift control unit 14 selects a gear stage lower by one step than the present gear stage and outputs a shift signal for setting that gear stage to the hydraulic control unit 10. Specifically, if the downshift signal is outputted while the vehicle is running at the 3rd speed, signals are outputted to release the third clutch means K3 and the second brake means B2 and to engage the fourth clutch means K4 and the third brake means B3. In accordance with these releases and engagements, the hydraulic control unit 10 controls the feed/drain of the oil pressure so that the 2.5th speed is set.

These manual shifts can be effected by storing the manual shift control unit 14 with the combination pattern of the engagement/release of the friction devices for setting the individual gear stages, as enumerated in Table 1, and by outputting signals for engaging or releasing the predetermined friction devices so as to establish engagement/release patterns for setting a gear stage higher or lower by one step than the present gear stage each time the upshift signal or the downshift signal is inputted.

Figure 4:
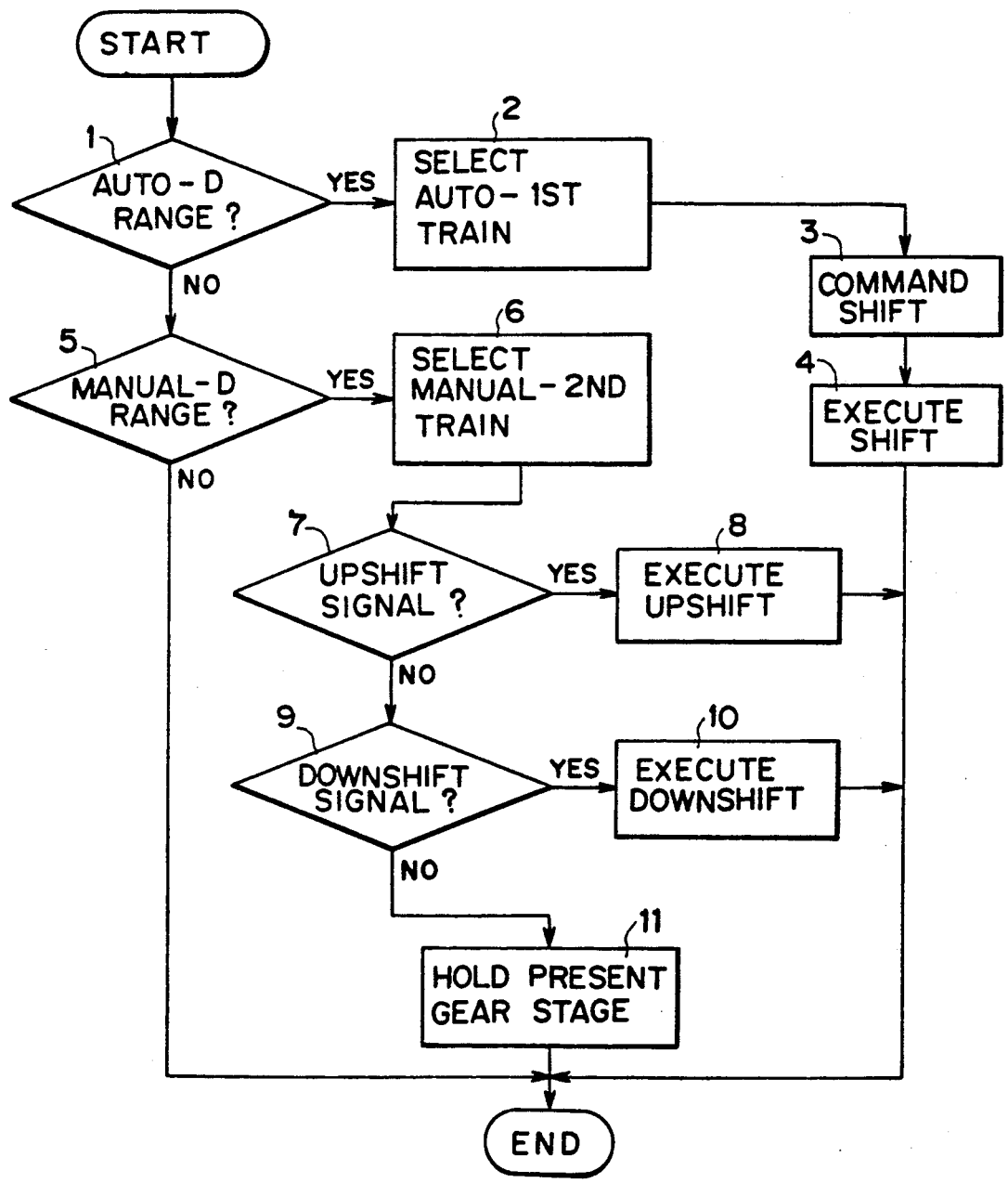
FIG. 4 is a flow chart showing a control routine.

The procedures of the aforementioned shift controls will be described in the following with reference to the flow chart shown in FIG. 4.

First of all, it is decided (at Step 1) whether or not the range is the D in the automatic shift mode. This decision depends, in the structure shown in FIG. 1, upon whether or not the shift lever 13 is located at the left-hand side of FIG. 2 so that the automatic shift control unit 12 operates. If the answer is "YES", the automatic shift control unit 12 selects (at Step 2) a predetermined gear stage from the first gear stage train on the basis of the running state of the vehicle such as the throttle opening $\theta$ and the vehicle speed V. In order to set that gear stage, the shift signal is outputted (at Step 3) to the hydraulic control unit 10. In order to set the gear stage, moreover, the hydraulic control unit 10 executes (at Step 4) the shift by feeding or discharging the oil pressure to the aformentioned friction devices.

If the answer of Step 1 is "NO", on the other hand, the routine advances to Step 5, at which it is decided whether or not the shift is manual. This decision depends upon whether or not the shift lever 13 is located at the righthand side of FIG. 2 so that the upshift signal or the downshift signal can be outputted. If this answer is "NO", the outstanding controls are ended. If "YES", on the contrary, the manual shift control unit 14 is rendered operative to select (at Step 6) the aformentioned second one as the sequence of gear stages. If, in this state, the upshift signal is outputted (i.e., "YES" at Step 7) from the shift stage selection unit 13a, the upshift is executed (at Step 8). On the basis of the signals inputted from the manual shift control unit 14, the hydraulic control unit 10 feeds and drains the oil pressure for establishing the engagement/release pattern of the friction devices to set a gear stage higher by one step than the present gear stage. If the downshift signal is outputted from the gear stage selection unit 13a, namely, if the answer of Step 7 is "NO" and if the answer of Step 9 is "YES", the downshift is executed (at Step 10). On the basis of the signals inputted from the manual shift control unit 14, the hydraulic control unit 10 feeds and drains the oil pressure for establishing the engagement-/release pattern of the friction devices to set the gear stage lower by one step than the present gear stage. If the answer of Step 9 is "NO", on the contrary, neither the upshift signal nor the downshift signal is outputted in the manual shift mode so that the present gear stage is held (at Step 11).

In the automatic shift mode, according to the aformentioned control system of the automatic transmission, the five speeds are established in the forward stage and have their individual gear ratios approximating to the geometric series and set to have considerable differences. As a result, the shifts can be smoothed without any busy shift feeling. In the manual shift mode, on the other hand, the forward stages are eight in total, and the gear ratios from the 2nd to 4th speeds have small differences so that the shifts can be effected with few shocks.

As could be apparent from the description thus far made, the present invention can be applied to effectively operate an automatic transmission which can set a second sequence of gear stages which is composed of gear stages having smaller gear ratio differences than those of a first sequence of gear stages and a relation approximating to the geometric series. Other examples of such gear train will be described in the following.

Figure 3:
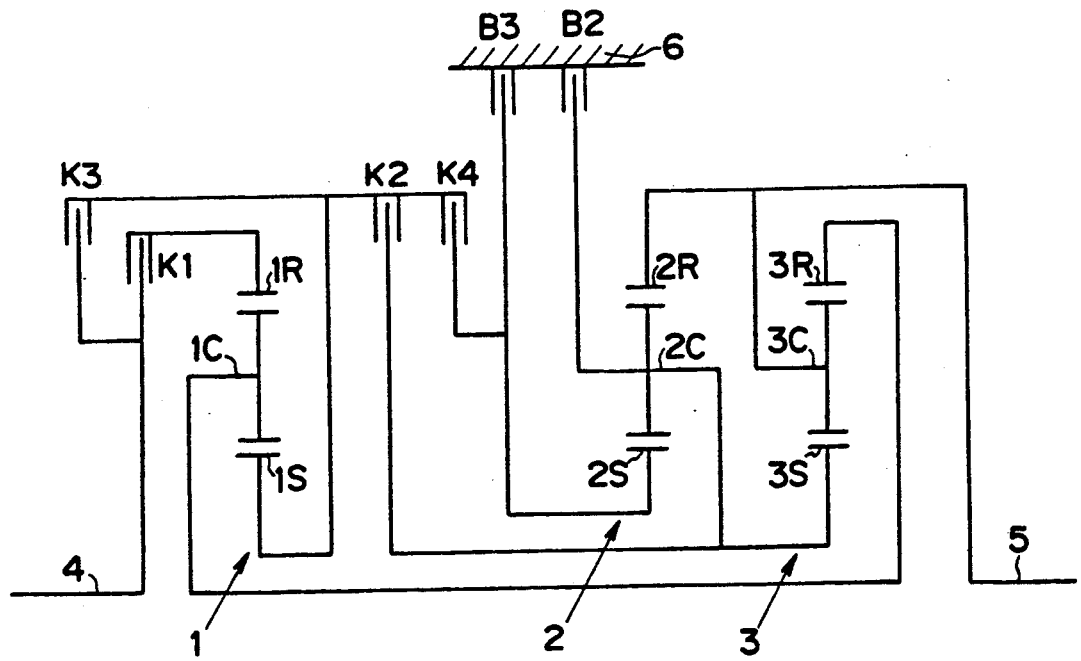
FIG. 3 is a skeleton diagram showing one example of a gear train.
Figure 5:
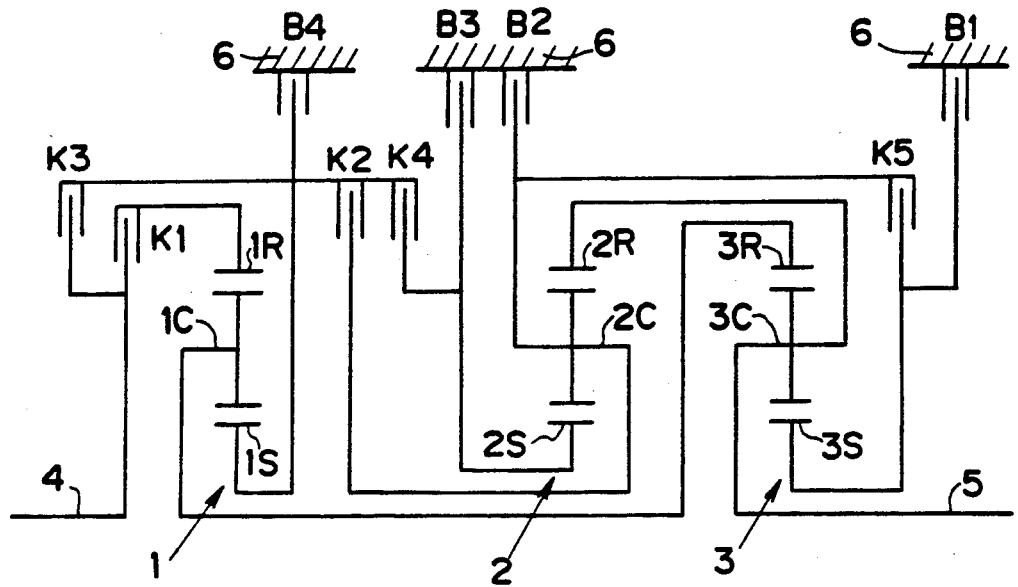
FIGS. 5 and 6 are skeleton diagrams showing other examples of the gear train.

The example of FIG. 5 is different from the structure shown in FIG. 3 in that there is interposed between the carrier 2C of the second planetary gear set 2 and the sun gear 3C of the third planetary gear set 3 fifth clutch means K5 for connecting the two selectively, and such that there are additionally provided first brake means B1 capable of holding the sun gear 3S of the third planetary gear set 3 by itself and fifth brake means B4 capable of holding the sun gear 1S of the first planetary gear set 1 by itself. The clutch and brake application chart for this example is presented in Table 2.

If the automatic transmission is equipped with the gear train shown in FIG. 5, the first sequence of gear stages to be selected in the automatic shift mode may be composed of the 1st, 2nd, 3rd, 4th and 5th speeds, and the second sequence of gear stages to be selected in the manual shift mode may be composed of any or all of 2.2th, 2.5th, 2.7th, 3.2th and 3.5th speeds in addition to those 1st to 5th speeds.

Figure 6:
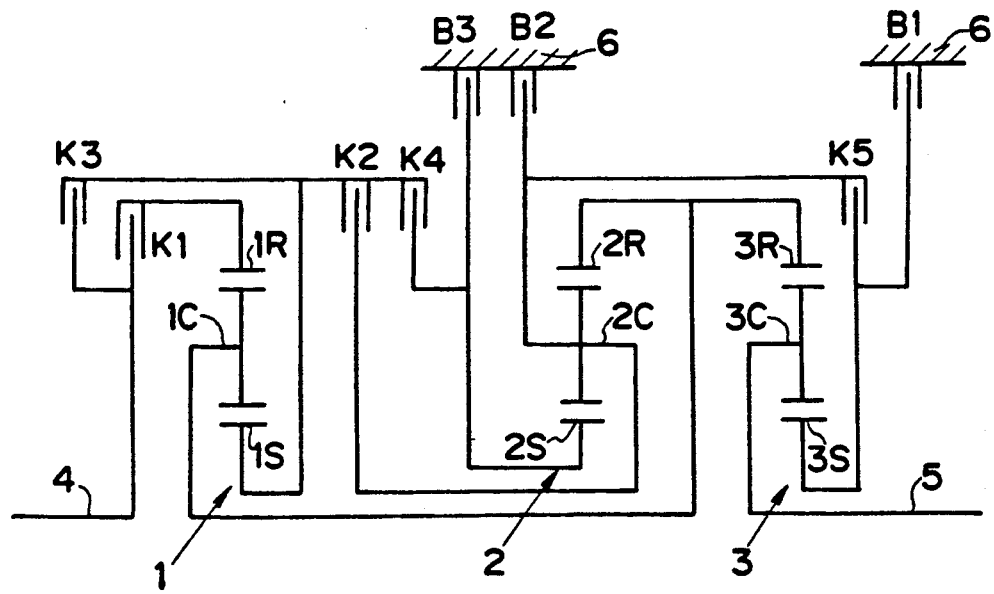

On the other hand, the example shown in FIG. 6 is modified from the structure of FIG. 5 such that the ring gear 2R of the second planetary gear set 2 in place of the carrier 3C of the third planetary gear set 3 is connected to the ring gear 3R, and such that the fourth brake means B4 is abolished. The clutch and brake application chart for this example is presented in Table 3.

TABLE 2

| | | Clutch Means | | | | | Brake Means | | | | Gear Ratio |
|---|---|---|---|---|---|---|---|---|---|---|---|
| | | K1 | K2 | K3 | K4 | K5 | B1 | B2 | B3 | B4 | |
| 1st | | ① ○ | | | | ○ | ○ ○ | | | • | 3.149 |
| 2nd | | ② ○ | | | ○ | ○ | • | ○ | | | |
| | | ③ ○ | | | ○ | • | ○ | ○ | | | |
| a | | ① ○ | ○ | | | ○ | ○ | • | | • | 2.037 |
| | | ② ○ | ○ | | | ○ | • | ○ | | • | |
| | | ③ ○ | ○ | | | ○ | • | • | | ○ | |
| | | ④ ○ | ○ | | | • | ○ | ○ | | • | |
| | | ⑤ ○ | ○ | • | | • | ○ | • | | ○ | |
| | | ⑥ ○ | ○ | • | | ○ | • | ○ | | ○ | |
| b | | ① ○ | | | ○ | | ○ | | ○ | • | |
| | | ② ○ | | | • | | ○ | | • | ○ | |
| 2.2th | | ○ | ○ | | | | ○ | | ○ | | 1.717 |
| 2.5th | | ① ○ | | | ○ | ○ | | ○ | • | | 1.619 |
| | | ② ○ | | | ○ | ○ | | • | ○ | | |
| | | ③ ○ | | | • | ○ | | ○ | ○ | | |
| 2.7th | | ○ | ○ | | ○ | ○ | | | | | 1.587 |
| 3rd | | | | | | | | | | | |
| a | | ① ○ | | ○ | | • | ○ | • | | | 1.405 |
| | | ② ○ | | ○ | | ○ | • | ○ | • | | |
| b | | ○ | | ○ | • | | ○ | | | | |
| c | | ○ | • | ○ | | | ○ | | | | |
| d | | ○ | | ○ | | | ○ | | | | |
| 3.2th | | ○ | ○ | | | ○ | | | ○ | | 1.299 |
| 3.5th | | ○ | | ○ | | ○ | | | ○ | | 1.117 |
| 4th | | | | | | | | | | | |
| a | | ① • | ○ | ○ | ○ | • | | | | | 1.000 |
| | | ② ○ | ○ | ○ | • | ○ | | | | | |
| | | ③ ○ | ○ | • | ○ | ○ | | | | | |
| | | ④ ○ | • | ○ | ○ | ○ | | | | | |
| b | | | | ○ | ○ | ○ | | • | | | |
| 5th | | | | | | | | | | | |
| a | | | | ○ | ○ | | • | | ○ | | 0.715 |
| b | | • | | ○ | ○ | | | | ○ | | |
| c | | | | ○ | ○ | | • | | ○ | | |
| Rev | | | | | | | | | | | |
| a | | ① | | ○ | ○ | • | • | ○ | | | −2.469 |
| | | ② | • | ○ | ○ | ○ | ○ | • | | | |
| b | | | • | ○ | ○ | | | ○ | | | |

TABLE 3

| | | Clutch Means | | | | | Brake Means | | | Gear Ratio |
|---|---|---|---|---|---|---|---|---|---|---|
| | | K1 | K2 | K3 | K4 | K5 | B1 | B2 | B3 | |
| 1st | | ○ | | | ○ | ○ | ○ | • | | 3.149 |
| | | ○ | | | ○ | ○ | • | ○ | | |
| | | ○ | | | ○ | • | ○ | ○ | | |
| 2nd | | | | | | | | | | |
| a | | ○ | ○ | | | ○ | ○ | • | | 2.037 |
| | | ○ | ○ | | | ○ | • | ○ | | |
| | | ○ | ○ | | | • | ○ | ○ | | |
| b | | ○ | | | ○ | | ○ | | ○ | |
| 2.2th | | ○ | ○ | | | | ○ | | ○ | 1.634 |
| 2.5th | | ○ | | | ○ | ○ | | ○ | ○ | 1.619 |
| 3rd | | | | | | | | | | |
| a | | ○ | | ○ | | • | ○ | • | | 1.405 |

TABLE 3-continued

| | | K1 | K2 | K3 | K4 | K5 | B1 | B2 | B3 | Gear Ratio |
|---|---|---|---|---|---|---|---|---|---|---|
| | | ○ | | ○ | | ○ | * | ○ | | |
| b | | ○ | * | ○ | * | | ○ | | * | |
| c | | ○ | | ○ | * | ○ | ○ | | | |
| | | | ○ | | ○ | ○ | ○ | | | |
| 3.2th | | ○ | ○ | | | ○ | | | ○ | 1.299 |
| 3.5th | | ○ | | ○ | | ○ | | | ○ | 1.117 |
| 4th | | ○ | | ○ | * | ○ | | | | 1.000 |
| | | ○ | ○ | | ○ | ○ | | | | |
| | | ○ | * | ○ | ○ | ○ | | | | |
| 4.5th | | | ○ | ○ | | ○ | | ○ | | 0.895 |
| 5th | | | ○ | ○ | | ○ | | | ○ | 0.712 |
| Rev | | | | ○ | ○ | ○ | ○ | * | | −2.469 |
| | | | | ○ | ○ | * | ○ | ○ | | |

Like the foregoing individual examples, in this example of FIG. 6, too, the first sequence of gear stage may be composed of the 1st, 2nd, 3rd, 4th and 5th speeds, and the second sequence of gear stage may be composed of any or all of 2.2th, 2.5th, 2.7th, 3.2th and 3.5th speeds in addition to those 1st to 5th speeds.

Other examples of the gear train capable of the shifts utilizing the gear stages having gear ratios different from the geometric series, as different from the foregoing description, can be enumerated by the structures which are disclosed in the Specifications and Drawings of Japanese Patent Applications Nos. Hei 1-185151, Hei 1-185152, Hei 1-186991, Hei 1-186992, Hei 1-205478 and Hei 1-280957, all of which have already been proposed by us.

What is claimed is:

1. A shift control system for a vehicular automatic transmission including a gear train to be set to a plurality of gear stages in accordance with engaged or released states of a plurality of friction devices, comprising:
   mode selection means for selecting an automatic shift mode to effect a shift according to a first sequence of gear stages, which is composed of a plurality of gear stages selected from those capable of being set with said gear train, or a manual shift mode to effect a shift according to a second sequence of gear stages, which is composed of other plural gear stages selected from those capable of being set with said gear train;
   automatic shift control means for outputting a shift signal in accordance with a running state of a vehicle to set any of the gear stages of said first sequence of gear stages when said automatic shift mode is selected;
   gear stage selection means for outputting an upshift signal and a downshift signal in response to operations of manual upshift and downshift, respectively, when said manual shift mode is selected;
   manual shift control means responding to the upshift signal and downshift signal outputted from said gear stage selection means, for outputting a shift signal to select and set a gear stage from said second sequence of gear stages; and
   hydraulic control means for feeding/draining an oil pressure to said friction devices to set the gear stage which is commanded by the shift signals outputted from said automatic shift output means and said manual shift output means,
   wherein absolute values of differences between gear ratios of adjoining gear stages of said first sequence of gear stages are smaller than those of said second sequence of gear stages.

2. A shift control system according to claim 1, wherein the number of gear stages composing said first sequence of gear stages is smaller than that of gear stages composing said second sequence of gear stages.

3. A shift control system according to claim 1, further comprising a shift lever for selecting a plurality of ranges including a drive range and a reverse range, for selecting said automatic shift mode and said manual shift mode, and for operating said upshift and said downshift.

4. A shift control system according to claim 1, wherein said automatic shift output means outputs said shift signal for setting any of the gear stages of said first sequence of gear stages based on a vehicle speed and a throttle opening.

5. A shift control system according to claim 1, wherein said manual shift output means outputs the shift signal, at each time said upshift signal is inputted, to upshift by one gear stage, and the shift signal, at each time said downshift signal is inputted, to downshift by one gear stage.

6. A shift control system according to claim 1, wherein said gear train comprises:
   an input shaft;
   an output shaft;
   a first planetary gear set comprising a first sun gear, a first ring gear, a pinion gear meshing with said first sun gear and said first ring gear, and a first carrier supporting said pinion gear;
   a second planetary gear set comprising a second sun gear connected integrally or selectively to said first sun gear, a second ring gear, a pinion gear meshing with said second sun gear and said second ring gear, and a second carrier supporting said pinion gear; and
   a third planetary gear set comprising a third sun gear connected integrally or selectively to said second carrier, a third ring gear connected integrally or selectively to said first carrier, a pinion gear meshing with said third sun gear and said third ring gear, and a third carrier supporting said pinion gear and connected integrally or selectively to said second ring gear.

7. A shift control system according to claim 6, wherein said friction devices comprise:
   first clutch means for connecting said input shaft and said first ring gear selectively;
   second clutch means for connecting said first sun gear and said second carrier selectively;
   third clutch means for connecting said input shaft and said first sun gear selectively;
   fourth clutch means for connecting said first sun gear and said second sun gear selectively;
   first brake means for stopping the rotation of said second carrier selectively; and
   second brake means for stopping the rotation of said second sun gear selectively, and
   wherein said output shaft is connected to said third carrier.

8. A shift control system according to claim 1, wherein said gear train comprises:
   an input shaft;
   an output shaft;

a first planetary gear set comprising a first sun gear, a first ring gear, a pinion gear meshing with said first sun gear and said first ring gear, and a first carrier supporting said pinion gear;

a second planetary gear set comprising a second sun gear connected integrally or selectively to said first sun gear, a second ring gear connected integrally or selectively to said first carrier, a pinion gear meshing with said second sun gear and said second ring gear, and a second carrier supporting said pinion gear; and a third planetary gear set comprising a third sun gear connected integrally or selectively to said second carrier, a third ring gear connected integrally or selectively to said second ring gear, a pinion gear meshing with said third sun gear and said third ring gear, and a third carrier supporting said pinion gear.

9. A shift control system according to claim 8, wherein said friction devices comprise:

first clutch means for connecting said input shaft and said first ring gear selectively;

second clutch means for connecting said first sun gear and said second carrier selectively;

third clutch means for connecting said input shaft and said first sun gear selectively;

fourth clutch means for connecting said first sun gar and said second sun gear selectively;

fifth clutch means for connecting said second carrier and said third sun gear selectively;

first brake means for stopping the rotation of said second carrier selectively;

second brake means for stopping the rotation of said second sun gear selectively; and third brake means for stopping the rotation of said third sun gear selectively, and wherein said output shaft is connected to said third carrier.

10. A shift control method for a vehicular automatic transmission including a gear train to be set to a plurality of gear stages in accordance with engaged or released states of a plurality of friction devices, comprises:

outputting a shift signal in accordance with a running state of the vehicle, when an automatic shift mode to effect a shift according to a first sequence of gear stages composed of a plurality of gear stages selected from those capable of being set with said gear train is selected, so as to set any of the gear stages of said first sequence of gear stages so that a hydraulic control unit may be actuated in response to said shift signal to set a gear stage instructed by said shift signal; and outputting an upshift signal and a downshift signal by manual operations of upshift and downshift, respectively, when a manual shift mode to effect a shift according to a second sequence of gear stages composed of other plural gear stages selected from those capable of being set with said gear train is selected, so as to set any of the gear stages of said second sequence of gear stages so that said hydraulic control unit may be actuated in response to a shift signal based upon said upshift signal and said downshift signal to executed an upshift and a downshift, wherein absolute values of differences between gear stages of said first sequence of gear stages are smaller than those of said second sequence of gear stages.

11. A shift control method according to claim 10, wherein the number of gear stages composing said first sequence of gear stages is smaller than that of gear stages composing said second sequence of gear stages.

12. A shift control method according to claim 10, wherein said shift signal when said automatic shift mode is selected is outputted for setting any of the gear stages of said first sequence of gear stages based on a signal relating to a vehicle speed and a signal relating to an engine load.

13. A shift control method according to claim 10, wherein an upshift by one gear stage is executed at each time said upshift signal is outputted, and wherein a downshift by one gear stage is executed at each time said downshift signal is outputted.

* * * * *